United States Patent
Hajjar

(10) Patent No.: US 11,128,845 B2
(45) Date of Patent: Sep. 21, 2021

(54) DISPLAY SYSTEM WITH MULTIPLE BEAM SCANNERS

(71) Applicant: Prysm Systems, Inc., Milpitas, CA (US)

(72) Inventor: Roger A. Hajjar, San Jose, CA (US)

(73) Assignee: Prysm Systems Inc., Milpitas, CA (US)

( * ) Notice: Subject to any disclaimer, the term of this patent is extended or adjusted under 35 U.S.C. 154(b) by 0 days.

(21) Appl. No.: 17/059,135

(22) PCT Filed: May 24, 2019

(86) PCT No.: PCT/US2019/034060
§ 371 (c)(1),
(2) Date: Nov. 25, 2020

(87) PCT Pub. No.: WO2019/231862
PCT Pub. Date: Dec. 5, 2019

(65) Prior Publication Data
US 2021/0218939 A1 Jul. 15, 2021

Related U.S. Application Data

(60) Provisional application No. 62/677,601, filed on May 29, 2018.

(51) Int. Cl.
*H04N 9/31* (2006.01)
(52) U.S. Cl.
CPC ......... *H04N 9/3135* (2013.01); *H04N 9/3164* (2013.01); *H04N 9/3194* (2013.01)
(58) Field of Classification Search
CPC .. H04N 9/3129; H04N 9/3135; H04N 9/3194; H04N 9/3147; H04N 9/3155;
(Continued)

(56) References Cited

U.S. PATENT DOCUMENTS 6,888,655 B2   5/2005   Yamaguchi
7,869,112 B2   1/2011   Borcher et al.
(Continued)

FOREIGN PATENT DOCUMENTS

CN   101216659   7/2008
CN   102681306   9/2012
(Continued)

OTHER PUBLICATIONS

PCT International Search Report and Written Opinion in International Appln. No. PCT/US2019/034060, dated Sep. 19, 2019, 11 pages.

*Primary Examiner* — Sherrie Hsia
(74) *Attorney, Agent, or Firm* — Fish & Richardson P.C.

(57) ABSTRACT

A display system includes a display screen with at least one servo feedback mark in each of a plurality of display regions, and a plurality of subsystems each subsystem configured to generate an image on an associated display region. Each subsystem generate a plurality of scanning beams including an excitation beam and a servo beam, abeam scanning module, a servo feedback detector, and a controller. The beam scanning module includes a resonant scanning mirror configured to scan the scanning beams along a first scanning direction and a linear scanning mirror to scan the scanning beams along a second scanning direction. The controller is configured to receive image data, to modulate the excitation beam in accordance with the image data, and to control timing of modulation of the excitation beam based on the monitor signal to align the modulation with corresponding pixel positions on the display screen.

10 Claims, 12 Drawing Sheets

(58) Field of Classification Search
CPC ...... H04N 9/31; H04N 9/3164; H04N 9/3161; G02B 26/12; G02B 26/10; G02B 26/08; G09G 5/00; G02F 1/35; G02F 1/37
USPC .... 348/739, 744–747; 345/47, 48, 619, 690, 345/75.1; 353/30, 31; 359/198.1
See application file for complete search history.

(56) References Cited

U.S. PATENT DOCUMENTS

| | | |
|---|---|---|
| 7,878,657 B2 | 2/2011 | Hajjar |
| 8,136,951 B2 | 3/2012 | Murata et al. |
| 9,075,294 B2 | 7/2015 | Watanabe |
| 9,998,717 B2 | 6/2018 | Hajjar et al. |
| 2002/0180869 A1 | 12/2002 | Calllison |
| 2006/0145945 A1* | 7/2006 | Lewis .................. G02B 26/101 345/7 |
| 2006/0164707 A1 | 7/2006 | Kurihara et al. |
| 2007/0206258 A1* | 9/2007 | Malyak ................ H04N 9/3164 345/204 |
| 2009/0022188 A1* | 1/2009 | Almoric ................ G02F 1/377 372/22 |
| 2009/0102830 A1 | 4/2009 | Yeo |
| 2009/0141192 A1 | 6/2009 | Nojima |
| 2010/0020377 A1 | 1/2010 | Borchers et al. |
| 2010/0097678 A1* | 4/2010 | Hajjar .................. H04N 9/3135 359/198.1 |
| 2011/0298820 A1 | 12/2011 | Hajjar |
| 2012/0176347 A1 | 7/2012 | Mahajan |
| 2013/0335641 A1* | 12/2013 | Aoki .................... H04N 9/3129 348/744 |
| 2018/0007330 A1* | 1/2018 | Hajjar .................. H04N 9/3161 |
| 2018/0278898 A1 | 9/2018 | Hajjar et al. |
| 2020/0242988 A1* | 7/2020 | Hajjar .................. H04N 9/3147 |

FOREIGN PATENT DOCUMENTS

| | | |
|---|---|---|
| JP | 2005-024958 | 1/2005 |
| JP | 2006-184750 | 7/2006 |
| WO | WO 00/20912 | 4/2000 |
| WO | WO 2019/231862 | 12/2019 |

* cited by examiner

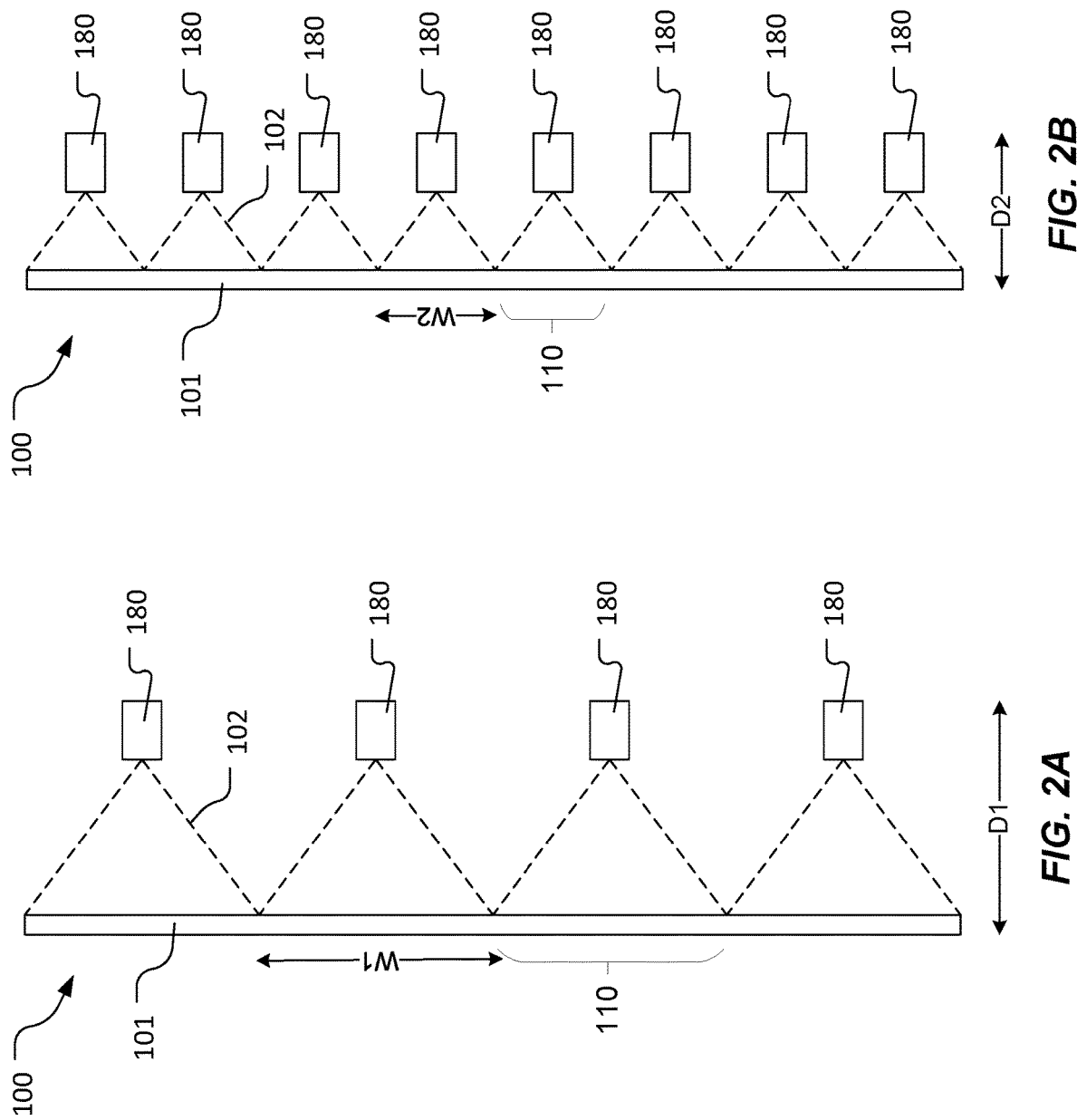

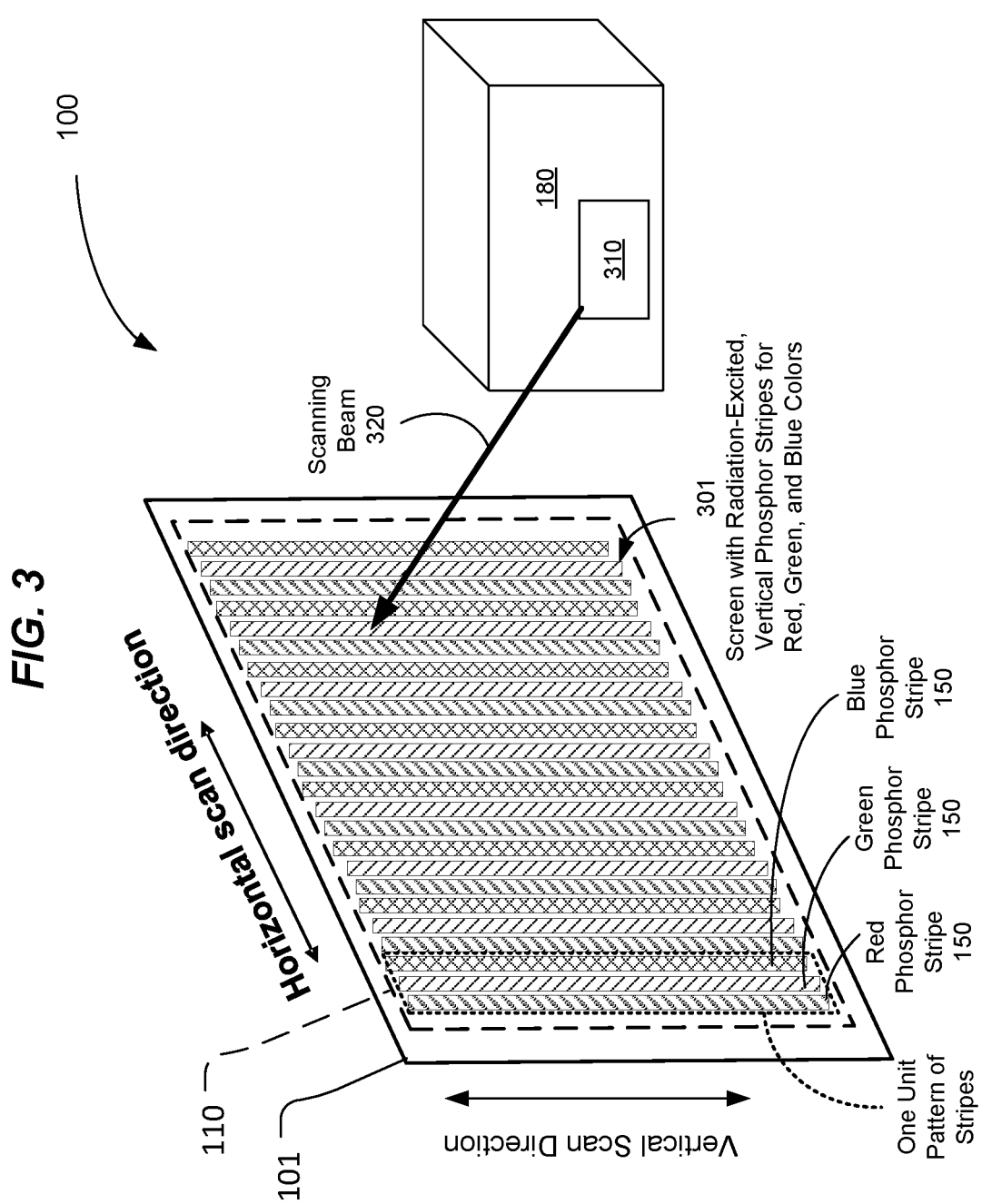

DISPLAY SYSTEM WITH MULTIPLE BEAM SCANNERS

CROSS-REFERENCE TO RELATED APPLICATIONS

This application claims priority to U.S. Provisional Application Ser. No. 62/677,601, filed on May 29, 2018.

BACKGROUND

This document relates to scanning-beam display systems.

In a scanning-beam display system, an optical beam can be scanned over a screen to form images on the screen. Some display systems, such as some laser display systems, use a polygon scanner with multiple reflective facets to provide horizontal scanning and a vertical scanning mirror, such as a galvo-driven mirror, to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

SUMMARY

Examples and implementations of techniques and display systems are described that provide a display screen that includes constituent display regions, with each display region addressed by a separate scanning beam.

In one aspect, a display system includes a display screen comprising at least one servo feedback mark in each of a plurality of display regions, and a plurality of subsystems. Each subsystem is configured to generate an image on an associated display region of the plurality of display regions. Each subsystem includes one or more light sources to generate a plurality of scanning beams including an excitation beam and a servo beam, a beam scanning module to receive the scanning beams and to direct the scanning beams onto the associated display region of the display screen, a servo feedback detector positioned to receive feedback light of the servo beam from the associated display region, to detect the servo feedback mark from the feedback light, and to produce a monitor signal indicative of a position of the at least one beam on the display region, and a controller. The beam scanning module includes a resonant scanning mirror configured to scan the scanning beams along a first scanning direction across the associated display region and a linear scanning mirror to scan the scanning beams along a second scanning direction across the associated display region. The controller is configured to receive image data including pixel data representing intensity values of pixels, to modulate the excitation beam in accordance with the image data, and to control timing of modulation of the excitation beam based on the monitor signal to align modulation based on intensity values of pixels with corresponding pixel positions on the display screen.

Implementations may include one or more of the following features.

The linear scanning mirror may be a rotating polygon mirror or galvo scanning mirror. The display screen may include a plurality of fluorescent stripes, and the stripes may extend along the second scanning direction. The at least one servo feedback mark may include a mark positioned between adjacent stripes or between at an edge of the display region. A scanning speed of the excitation beam along the first scanning direction may be greater than a scanning speed of the excitation beam along the second scanning direction.

The controller may be configured to configured to determine an oscillation frequency of the resonant scanning mirror based on the monitor signal. The controller may be configured to determine a position of the excitation beam over time from the oscillation frequency, a predetermined function that models a position of the excitation position along the first scanning direction as a function of time, and a time that the servo beam crosses the servo feedback mark.

The display screen may include a plurality of servo feedback mark in each of the plurality of display regions. The plurality of servo feedback marks may be distributed along the first scanning direction such that the servo beam reflects from each of the plurality of feedback marks in succession as the servo beam is scanned along the first scanning direction. The controller may be configured to determine a position of the excitation beam over time based on a number of servo feedback marks crossed by the servo beam.

Potential advantages may include (and are not limited to) one or more of the following.

The depth of a scanning display system (e.g., the minimum distance behind the screen required by the display system) can be decreased, without significantly increasing or even while decreasing cost. Precise coordination of a beam scanned by a resonant scanning mirror with phosphor regions can be achieved using feedback from a servo beam.

The details of one or more embodiments are set forth in the accompanying drawings and the description below. Other aspects, features and advantages will be apparent from the description, drawings and claims.

BRIEF DESCRIPTION OF THE DRAWINGS

FIG. 2A is a schematic side view of an example of a display system that uses multiple beam scanners to address multiple display regions of a display screen.

FIG. 2B is a schematic side view of another example of a display system that uses multiple beam scanners to address multiple display regions of a display screen.

FIG. 3 is a schematic perspective view of an example scanning laser display system having a light-emitting screen made of laser-excitable light-emitting materials (e.g., phosphors) to emit colored light under excitation of a scanning laser beam that carries the image information to be displayed.

DETAILED DESCRIPTION

Large scale displays (also called large format displays or large screen displays) are useful as "floor to ceiling" displays, and can have an imaging surface of 8 ft. square or larger. It is generally desirable for a large scale display to be thin, so to conserve usable square footage in the area in which the display is installed.

In some display systems, particularly large scale displays, a display screen can have regions that are separately addressed by separate scanning beams. In general, the larger the region addressed by a scanning beam, the greater the depth needed by the display system. Even use of complex optical paths, e.g., involving folding mirrors and the like, may not alleviate this problem entirely. However, by using a larger number of individual beam scanners, each covering a smaller region, the depth of the display system can be reduced. Ostensibly such an approach would be cost prohibitive due the scaling of the number of components. However, use of a servo feedback system can enable the use of lower accuracy and lower cost scanning components, e.g., a resonant scanning mirrors. Consequently, the depth of the display system can be decreased, without significantly increasing or even while decreasing cost.

Figure 1A:
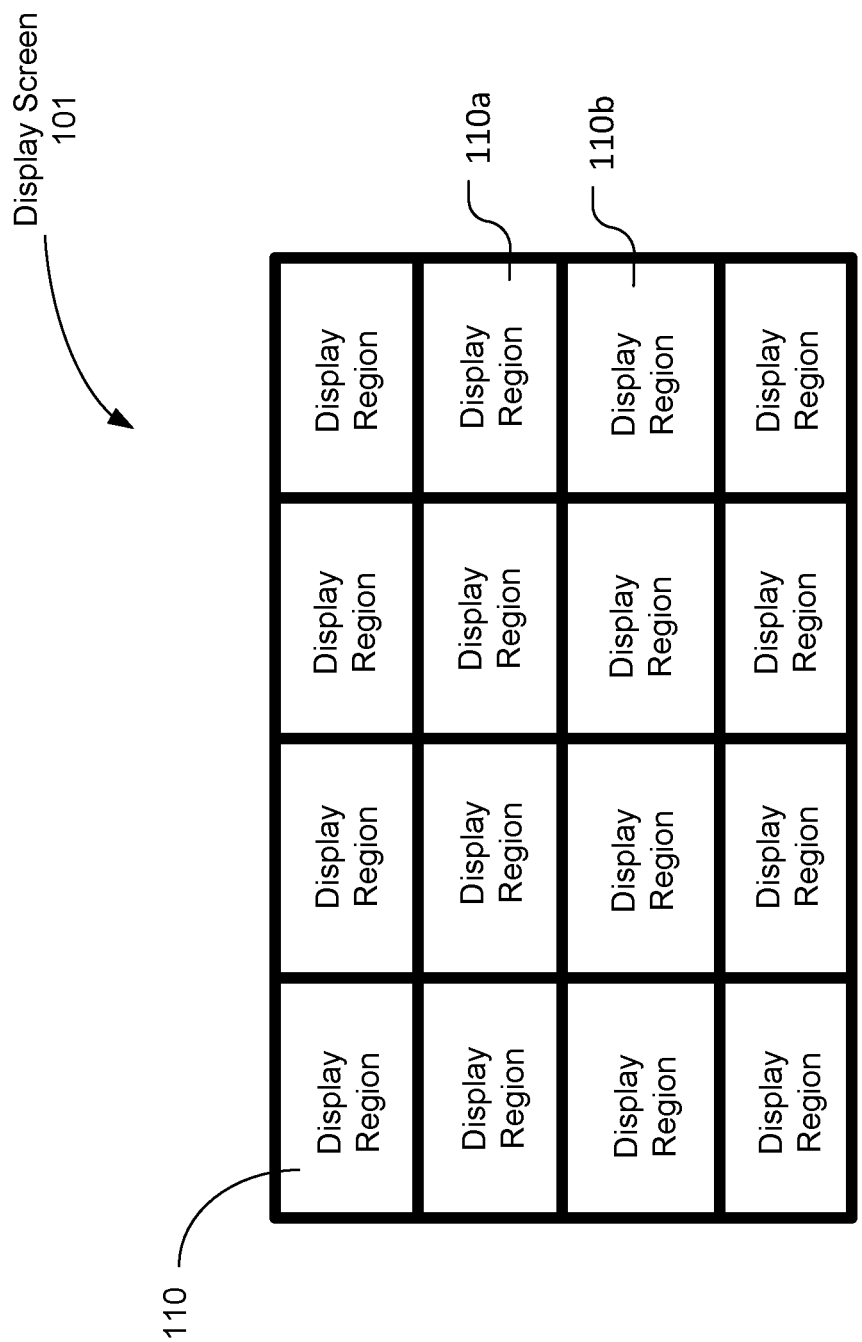
FIG. 1A is a schematic front view of an example of a display screen with multiple constituent display regions.

FIG. 1A shows an example of a display screen 101 on which multiple constituent display regions 110 are generated by multiple scanning beam engines. The display regions 110 are arranged in an array, e.g., a rectangular array. Each display region 110 can be quadrilateral, e.g., generally rectangular, although this is not required. The display regions 110 can abut or slightly overlap.

Figure 1B:
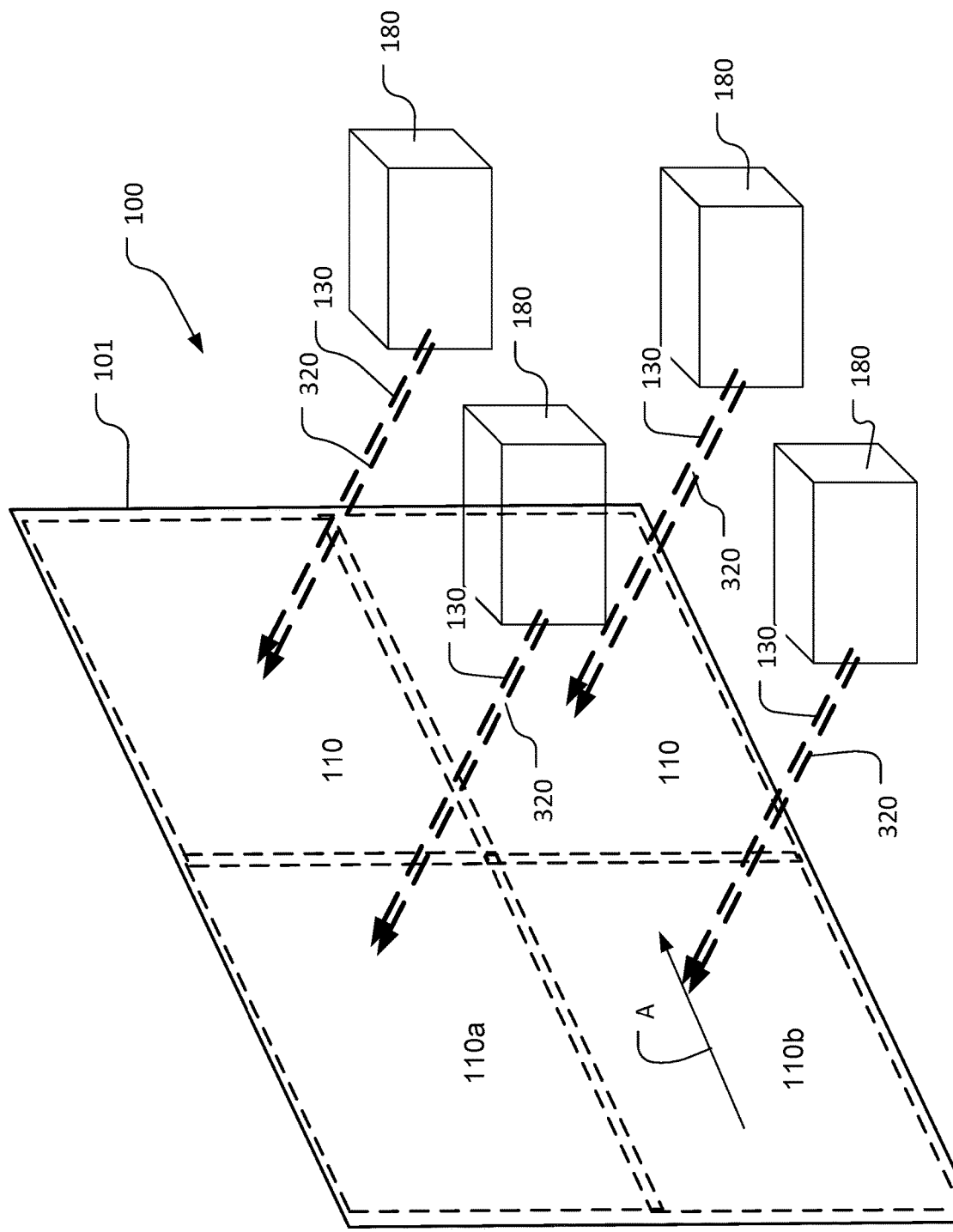
FIG. 1B is a schematic perspective view of an example of multiple scanning beams being used to address multiple display regions of a display screen.

Referring to FIGS. 1A and 1B, the display screen 101 can be part of a scanning beam display system 100. As shown in FIG. 1B, for each display region 110 there is an associated scanning beam engine 180. Each scanning beam engine 180 generates a scanning beam 320, e.g., an light beam, e.g., a laser beam, that scans, e.g., raster scans, across the associated display region 110. The scan can have a fast scan direction, e.g., as shown by arrow A, and a slow scan direction, e.g., perpendicular to the fast scan direction.

Figure 1C:
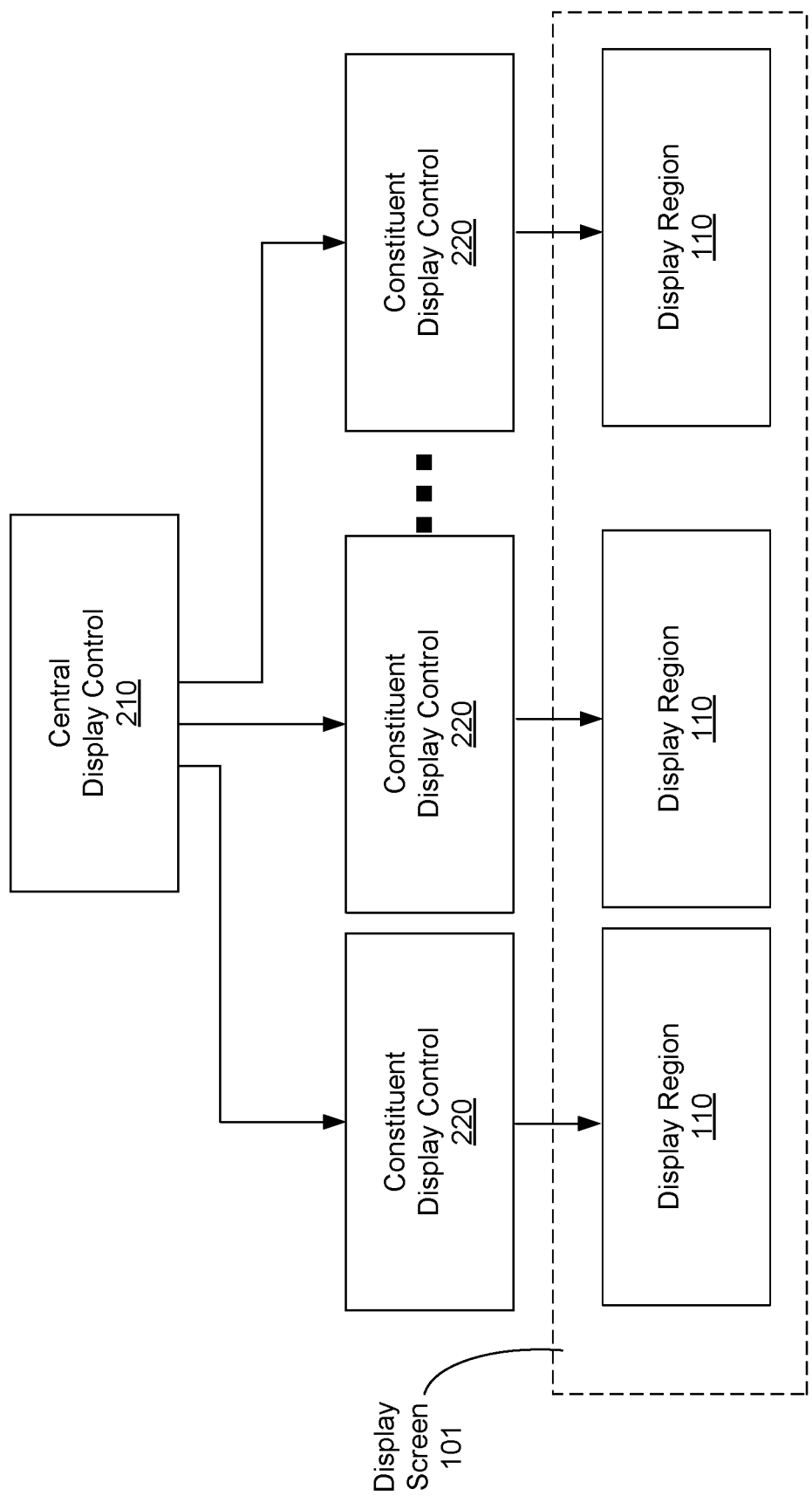
FIG. 1C is a schematic diagram of example of a control system for the display screen in FIG. 1A.

FIG. 1C shows an example of the control system for the display screen 101 in FIG. 1. In this example, each constituent display region 110 has its own display controller 220 that controls the operations of each display region 110. A central controller 210 for the display 100 is connected in communication with the display controllers 220 for the constituent display regions 110. The central controller 210 can receive image data, e.g., from a computer or the like, and divide the image data into portions that are directed to each display controller 220, which causes the associated display region 110 to display a fraction of the full image displayed by the display screen 100. Alternatively, the display could system could include just the single controller 210 directly coupled to each scanning beam engine 180.

Referring to FIG. 2A, each scanning beam engine 180 will have a field of view 102 in which an image can be effectively projected onto the display screen 101. The angle subtended by the field of view 102 is generally limited, e.g., by the maximum deflection of the physical components and/or by optical components. As such, the distance of the scanning beam engine 180 from the screen 101, and thus the depth D1 of the display 100, will depend on the width W1 or height of the constituent display regions 110 region.

The area of the display region 110 is proportional to the larger angle of the two optical angles scanned by the fast optical scanner (e.g., the horizontal scanner) and the slow scanner (e.g., the vertical scanner), multiplied by the optical depth of the system. The optical depth is to the distance from the scanner to the display screen surface. It is a function of the optical system magnification between the laser diode and the display screen. Example, for a laser diode to be imaged on the panel using an aspherical lens, the distance from the lens to the panel can be 100-150 mm, the optical depth is less than the 100-150 mm, Although complex optical paths, e.g., involving folding mirrors and the like, can shift the position of the beam engine to reduce the depth D1 of the display 100 somewhat, they do not alleviate this problem entirely. Moreover, precision controllable galvos are expensive, such that having multiple display regions will accordingly be expensive.

However, referring to FIGS. 2A and 2B, by reducing the width of the constituent display regions 110 (shown by width W2 in FIG. 2B), the distance of the scanning beam engine 180 from the screen 101 can also be reduced, and thus the depth D2 of the display 100 will also be reduced.

Notably, the reduction in the size of the display region 110 while keeping the same size of the display screen 101 will necessitate a larger number display regions 110 and thus a larger number of scanning beam engines 180. For example, if the dimensions of the display regions are halved, the number if the scanning beam engines increases by a factor of four. In general, such an approach would be counter-intuitive, because scaling of the number of beam scanning components would be cost prohibitive. However, use of a servo feedback system can enable the use of lower accuracy and lower cost scanning components, e.g., resonant scanning mirrors. Consequently, the depth of the display system can be decreased, without significantly increasing or even while decreasing cost.

Returning to FIGS. 1A and 1B, in a scanning beam display system 100, each display region 110 of the screen 101 can include light-emitting materials or fluorescent materials that emit light under excitation from the associated scanning beam 320. In some implementations, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. However, other optically excitable, light-emitting, non-phosphor fluorescent materials can be used. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

A scanning beam display system uses at least one scanning beam to excite color light-emitting materials deposited on a screen to produce color images. The scanning beam is modulated to carry image information in red, green and blue color channels and is controlled in such a way that the scanning beam excites the color light-emitting materials in red, green and blue colors with images in red, green and blue colors, respectively. Hence, the scanning beam carries the image information but does not directly produce the visible light seen by a viewer. Instead, the color light-emitting fluorescent materials on the screen absorb the energy of the scanning beam and emit visible light in red, green and blue to generate actual color images seen by the viewer. Of course, the display system 100 can use different and/or additional colors.

FIG. 3 illustrates an example of a scanning beam display system 100. The system includes a scanning beam engine 180 that includes a light source 310, e.g., a laser module, to produce and project at least one scanning beam 320, e.g., a laser beam, onto a display region 110 of the screen 101. Although this system illustrates only a single scanning beam engine 180, the discussion below can be applied to each scanning beam engine 180 and each display region of the screen 101.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range.

The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, a violet or a UV laser beam is used as an example of the excitation light for a phosphor material or other fluorescent material and may be light at other wavelength.

In the example scanning beam display system illustrated in FIG. 3, the screen 101 has parallel color phosphor stripes 150 that extend in the vertical direction. Pairs of adjacent phosphor stripes 150 are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used.

The excitation beam 320 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm to produce desired red, green and blue light.

The light source 310 can include one or more lasers such as UV diode lasers to produce the beam 320, a beam scanning mechanism to scan the beam 320 horizontally and vertically to render one image frame at a time on the screen 101, and a signal modulation mechanism to modulate the beam 320 to carry the information for image channels for red, green and blue colors. Such display systems may be configured as rear scanning systems where the viewer and the scanning beam engine 180 are on the opposite sides of the screen 101. The fast scan direction can be perpendicular to the color phosphor stripes, and the slow scan direction can be parallel to the color phosphor stripes.

Although phosphor stripes are described above, alternatively, the display screen 101 could include color pixilated light-emitting areas that define the image pixels on the screen.

Figure 4A:
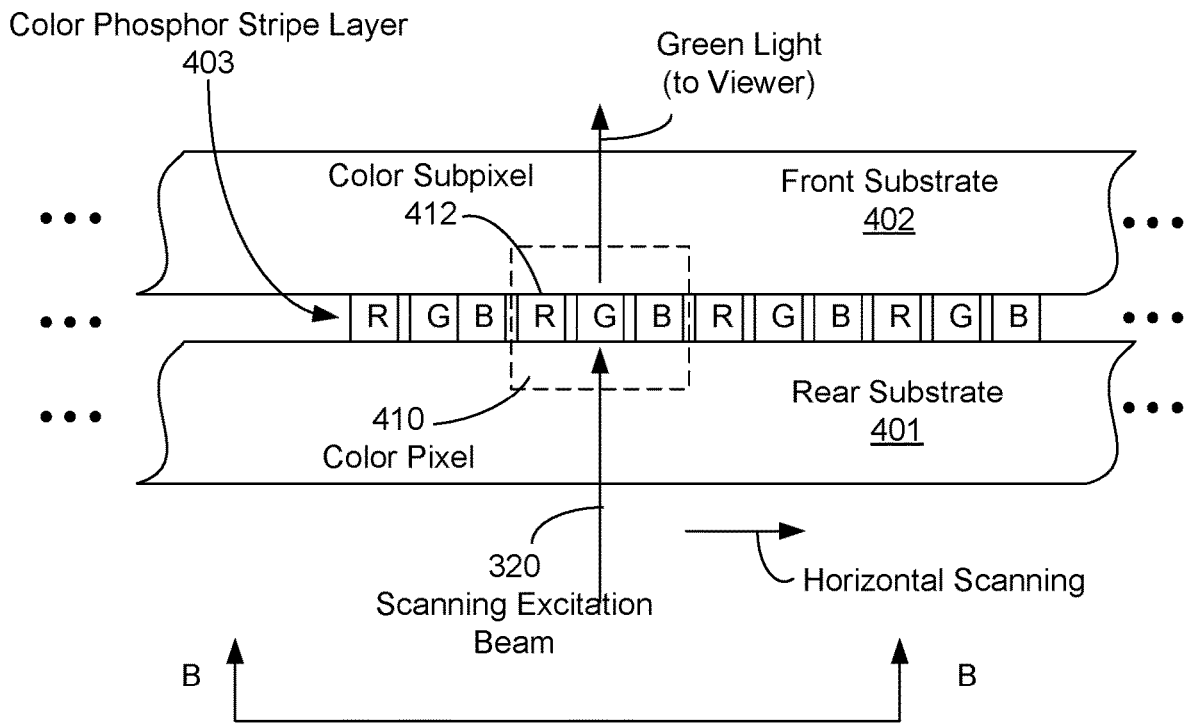
FIGS. 4A and 4B are a schematic cross-sectional side view and schematic top view, respectively, of one example screen structure with parallel light-emitting stripes and the structure of color pixels on the screen in FIG. 2.

FIG. 4A shows an exemplary design of the screen 101 in FIG. 3. The screen 101 may include a rear substrate 401 which is transparent to the scanning beam 320 and faces the light source 310 to receive the scanning beam 320. A second front substrate 402, is fixed relative to the rear substrate 401 and faces the viewer in a rear scanning configuration. In some implementation, the front substrate is used; the color phosphor stripe layer is exposed.

A color phosphor stripe layer 403 is placed between the substrates 401 and 402 and includes phosphor stripes. The color phosphor stripes for emitting red, green and blue colors are represented by "R", "G" and "B," respectively. The front substrate 402 is transparent to the red, green and blue colors emitted by the phosphor stripes. The substrates 401 and 402 may be made of various materials, including glass or plastic panels. The rear substrate 401 can be a thin film layer and can be configured to reflect the visible energy toward the viewer.

Each color pixel includes portions of three adjacent color phosphor stripes in the horizontal direction and its vertical dimension is defined by the beam spread of the scanning beam 320 in the vertical direction. As such, each color pixel includes three subpixels of three different colors (e.g., the red, green and blue). The module 180 scans the scanning beam 320 one horizontal line at a time, e.g., from left to right and from top to bottom to fill the screen 101.

Figure 4B:
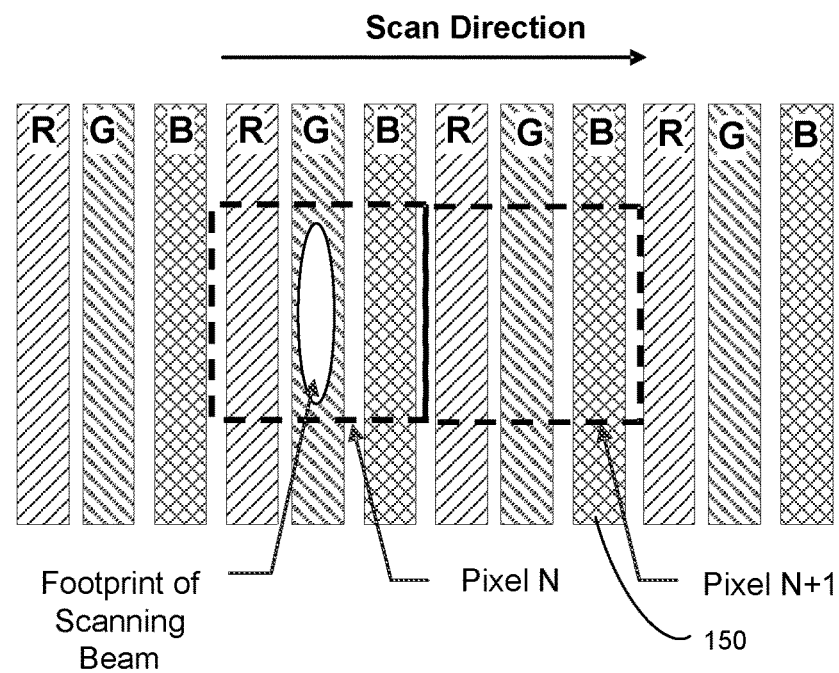

FIG. 4B further shows the operation of the screen 101 in a view along the direction B-B perpendicular to the surface of the screen 101. Since each color stripe 150 is longitudinal in shape, the cross section of the beam 320 may be shaped to be elongated along the direction of the stripe to maximize the fill factor of the beam within each color stripe for a pixel. This may be achieved by using a beam shaping optical element in the scanning beam engine 180.

Figure 5A:
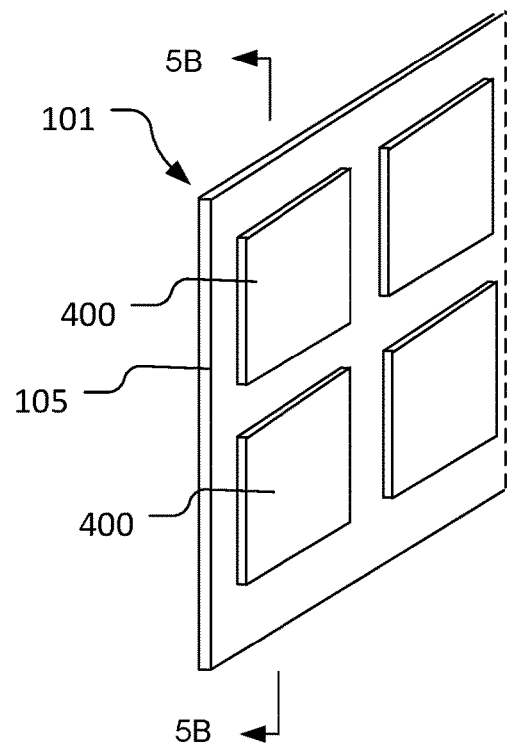
FIGS. 5A and 5B are a schematic perspective view and a schematic cross-sectional side view, respectively, of an example of a display screen with multiple sub-screens.
Figure 5B:
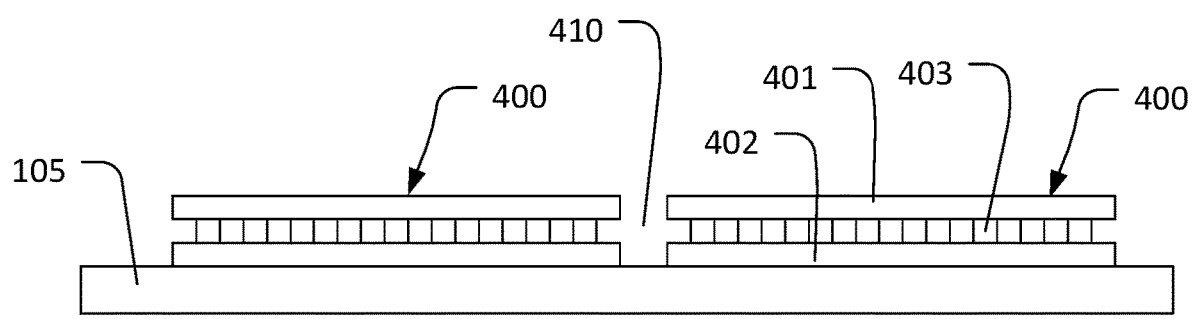

Referring to FIGS. 5A and 5B, the display screen 101 can be include multiple discrete display panels 400, with each panel 400 including a color phosphor stripe layer 403 placed between a front substrate 402 and a rear substrate 401, as described above for FIG. 4A. In particular, as shown in FIG. 5B, in some implementations, the display screen 101 includes a continuous backing sheet 105. Each panel 400 is secured to the backing sheet 105.

Assuming the panels 400 are secured to the side of the backing sheet 105 farther from the viewer, the front substrate 402 is closer to the backing sheet 105 than the rear substrate 401. Again assuming the panels 400 are secured to the side of the backing sheet farther from the viewer, the backing sheet 105 is a transparent to the visible light from the phosphors. For example, the backing sheet can be a hard plastic. Alternatively for this configuration, the backing sheet 105 could itself serve as the front substrate, i.e., there is no substrate 402 between the color phosphor stripe layer and the backing sheet 105.

Alternatively, the panels could be secured to the side of the backing sheet closer to the viewer. In this case, the rear substrate 401 is closer to the backing sheet 105 than the front substrate 402, and the backing sheet 105 is transparent to the scanning beam 320. Alternatively for this configuration, the backing sheet 105 could itself serve as the back substrate, i.e., there is no substrate 401 between the color phosphor stripe layer and the backing sheet 105. Alternatively for this configuration, the backing sheet 105 could itself serve as the front substrate, i.e., there is no front substrate 402 between the color phosphor stripe layer and the backing sheet 105.

Alternatively, the display screen 101 could be assembled from multiple panels 400 without a backing sheet 105, e.g., by taping edges of individual panels 400 together.

Each scanning beam engine 180 can include a laser source to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 6A:
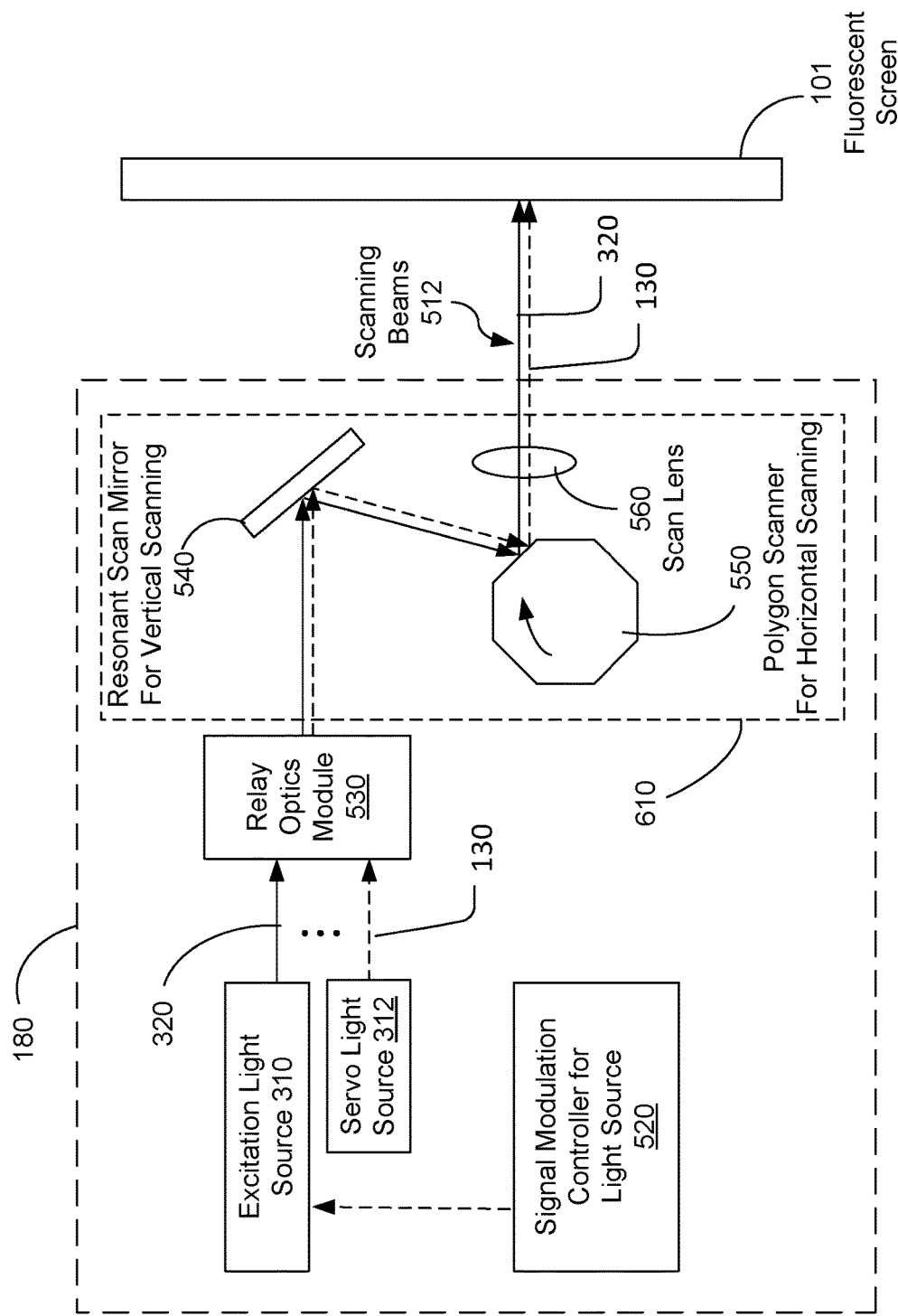
FIG. 6A is a schematic diagram of an example implementation in a pre-objective scanning configuration.

FIG. 6A shows an example implementation of one single scanning beam engine 180 from the array of scanning beam engines. The scanning beam engine 180 includes an excitation light source 310 to generate a single excitation beam 320 to scan the screen 101. The excitation beam 320 can be a laser beam, and the excitation light source 310 can be a laser.

The scanning beam engine 180 can also include a servo light source 310 to generate a single servo beam 130 to scan the screen 101. The servo beam 130 can have a different wavelength than the excitation beam 320. For example, the excitation beam can be in the ultraviolet range, whereas the servo beam 130 can be in the infrared range. The servo light beam 130 can be a laser beam, and the servo light source 310 can be a laser. In some implementations, the servo light source 312 is an IR laser and the excitation light 310 source is a UV laser.

Thus, in this implementation the scanning beam engine generates exactly two scanning beams 512, i.e., the excitation beam 320 and the servo beam 130.

A signal modulation controller 520 is provided to control and modulate the excitation beam 320. For example, the modulation controller 520 can control and modulate the excitation light source 310 so that the excitation light beam 320 is modulated to carry the image to be displayed in the corresponding display region 110 on the screen 101. The signal modulation controller 520 can include a digital image processor that generates digital image signals for the three different color channels. The signal modulation controller 520 can include laser driver circuits that produce control signals carrying the digital image signals. The control signals are then applied to modulate the light source 310, e.g., the current for a laser diode.

The beam scanning can be achieved by a scanning module 610. The scanning module includes a scanning mirror 540, in particular a resonant scanning mirror, the fast scanning direction, e.g., the horizontal scanning direction. The resonant scanning mirror can scan the beams 512 along a single axis. When driven, a resonant scanning mirror can undergo a oscillation with the angle of the mirror varying sinusoidally.

Figure 9:
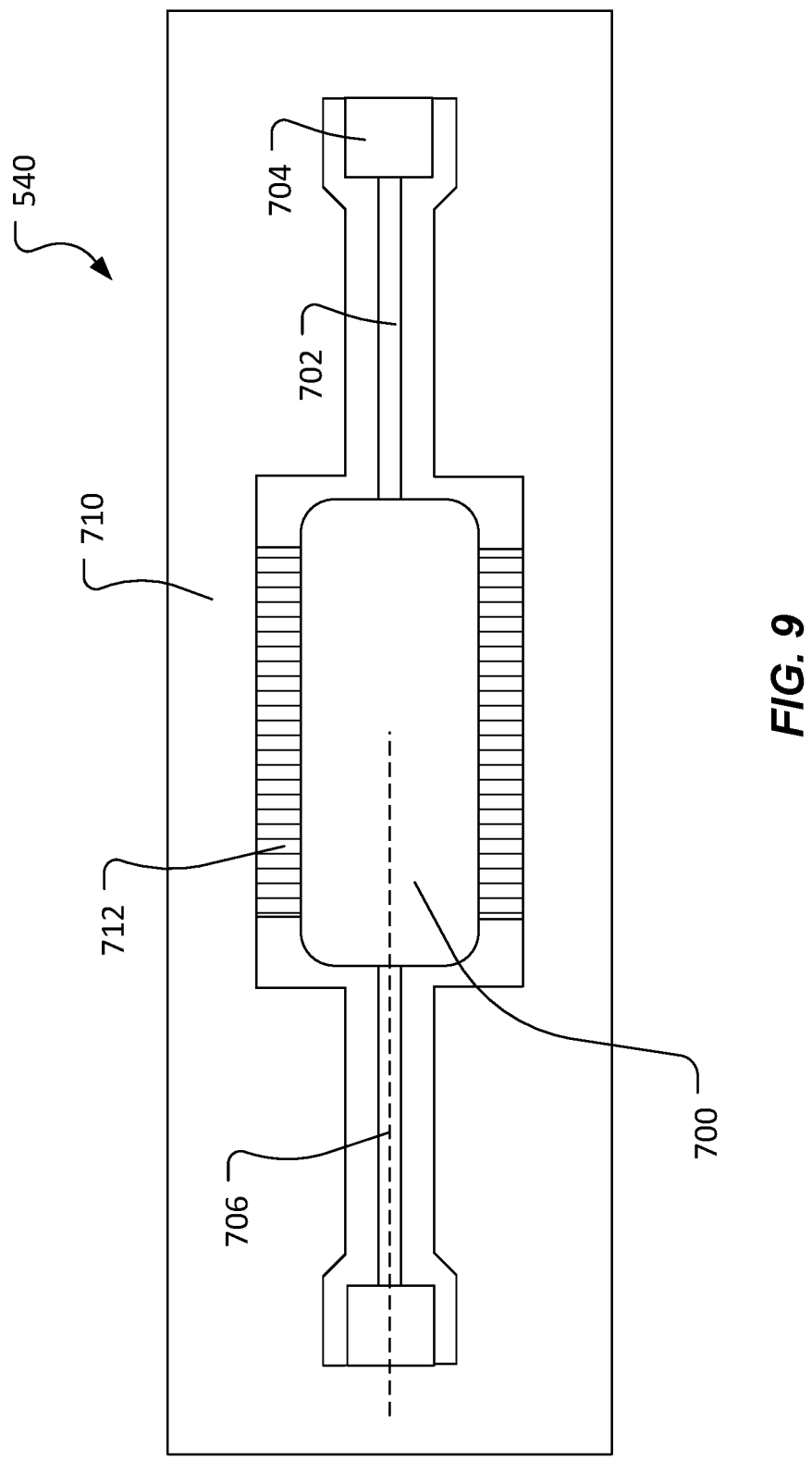
FIG. 9 is a schematic top view of a resonant scanning mirror.

Referring to FIG. 9, a resonant scanning mirror 540 generally includes a mirror plate 700 suspended above or in a cavity of a substrate 710, e.g., an etched silicon wafer. The mirror plate 700 can be coupled by struts 702 and a torsional spring 704 to the remainder of the substrate 710. The torsional spring 704 permits the mirror 700 to rotate about an axis 706 that extends along the struts 702. Fingers can extend from the mirror and from the substrate 710 to form an interdigited comb actuator 712. By applying an AC voltage to the fingers of the substrate in the comb actuator 712, the mirror 700 can be caused to oscillate about the axis 706.

Returning to FIG. 6A, the scanning projection module also includes a "linear scanning mirror" 550, i.e., a scanning mirror that is configured to traverse the scanning direction at a substantially uniform speed, for the slow scanning direction, e.g., the vertical scanning direction. The linear scanning mirror also scans the beams 512 along a single axis, e.g., the slow scanning direction. Examples of linear scanning mirrors include a multi-facet polygon mirror scanner or a galvo scanning mirror. A galvo scanning mirror uses a coil and magnet to move the mirror.

Each facet of the polygon scanner 550 can have the same angle of inclination relative to the axis of rotation of the polygon scanner. A scan lens 560 can be included to focus the excitation beam 320 and servo beam 130 from the polygon scanner 550 onto the screen 101. The scan lens 560 is designed to image each beam 512 onto the screen 101. Each of reflective facet of the polygon scanner 550 simultaneously scans the two scanning beams 512 (the excitation beam 320 and servo beam 130).

The various components, e.g., servo light source 312, relay optics module 530 and scanning projection module 610, can be configured such that the servo beam 130 travels a path collinear with the excitation beam 320, but slightly in advance of the excitation beam 320 along the fast-scan direction of travel, e.g., direction A (see FIG. 1B).

In the example illustrated in FIG. 6A, the scanning beams 512 are first directed to the resonant scanning mirror 540 and then from the resonant scanning mirror 540 to the polygon scanner 550. Alternatively, as shown in the example illustrated in FIG. 6B, the scanning beams 512 are first directed to the polygon scanner 550 and then from the resonant scanning mirror 550.

The excitation beam 320 is scanned spatially across the screen 101 to hit different color phosphors at different times. Accordingly, the modulated beam 320 carries the image signals for the red, green and blue colors for each pixel at different times and for different pixels at different times.

Hence, the modulated beam 320 is coded with image information for different phosphors at different times by the signal modulation controller 520. The excitation beam scanning thus maps the time-domain coded image signals in the beam 320 onto the spatial phosphor locations on the screen 101 for generating the pixels in the image. For example, the modulated beam 320 can have each color pixel time equally divided into three sequential time slots for the three color subpixels for the three different color channels. The modulation of the beam 320 may use pulse modulation techniques to produce desired grey scales in each color, a proper color combination in each pixel, and desired image brightness.

Figure 7:
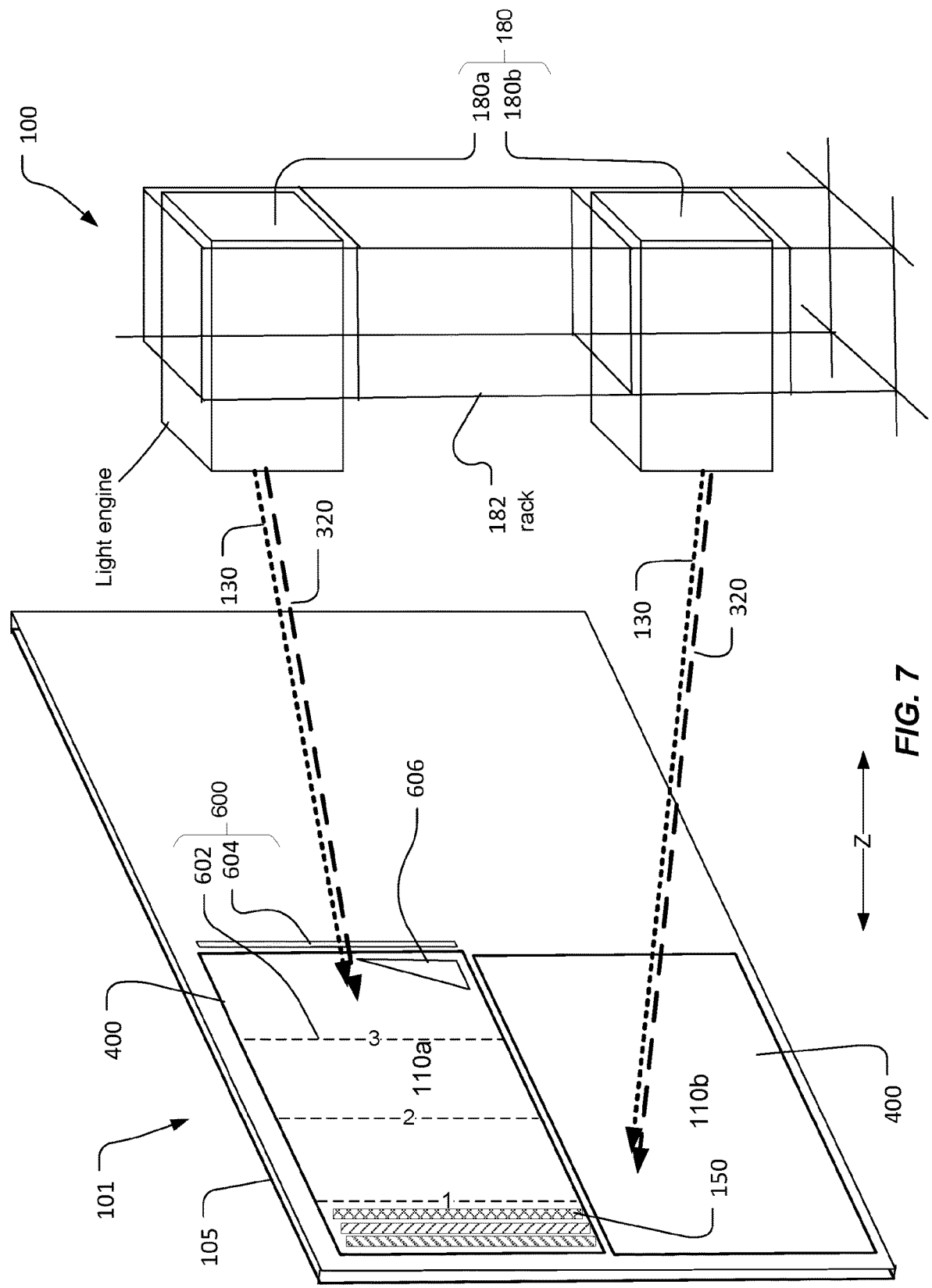
FIG. 7 is a schematic perspective view of an example of multiple scanning beams being used to address multiple display regions of a display screen.

FIG. 7 illustrates a scanning beam display 100 that includes a screen 101 being addressed by multiple scanning beam engines 180, e.g., scanning beam engines 180a and 180b. The scanning beam engines 180 are secured to a rack 182 to maintain the engines 180 in a fixed position relative to each other in all three axes.

Each scanning beam engine generates a single excitation beam 320 to address a different region 110. For example the excitation beam 320 from engine 180a can address region 110a, and the excitation beam from engine 180 can address region 110b. Each region 110 can include the parallel fluorescent stripes 150 (only three stripes are illustrated so that location of the scribe marks 600 can be shown).

The modulation of the excitation beam 320 needs to be coordinated with the position of the excitation beam 320 on the display screen so phosphor locations corresponding to each pixel are modulated with appropriate data. In addition, the excitation beam 320 may need to be deactivated when beam spot does not completely overlie a fluorescent strip 150. For example, a UV excitation beam may need to be deactivated for safety (e.g., to prevent the UV light from passing through the screen 101 to the viewers).

Unfortunately, the components in the beam scanning module 610 are not necessarily stable. For example, the although the resonant scan mirror 540 can operate at a high frequency, e.g., 20-23 kHz, the oscillation frequency can drift. Moreover, the position of the resonant scan mirror 540 cannot be precisely controlled. Furthermore, the resonant scan mirror 540 tends to cause the horizontal position of the excitation beam 320 on the screen 101 to vary non-linearly, e.g., sinusoidally (rather than substantially linearly, as with a rotating polygon mirror or a galvo mirro scanner driven with a triangular wave). As such, the excitation beam 320 cannot be modulated simply on the assumption that the beam is horizontally traversing the screen 101 at a substantially constant speed. Rather, the actual horizontal position of the excitation beam 320 needs to be determined and used to control the modulation of the excitation beam 320.

Various alignment mechanisms can be provided to coordinate the timing of the modulation of the excitation beam 320 with the position of the scanning beam 320. In particular, a feedback mechanism can be used to monitor the vertical (and horizontal) position of the scanning beam.

The feedback mechanism include reference marks on the screen. The reference marks can be between the fluorescent stripes and/or overlying the fluorescent stripes and/or in one or more peripheral areas outside the fluorescent area. The reference marks can reflect servo light to create feedback light, and the feedback light can be measured by using one or more optical servo sensors to produce one or more feedback servo signals. A servo control in the scanning beam engine 180 processes this feedback servo signal to extract the information on the beam positioning and other properties of the beam on the screen and, in response, adjust the timing of the modulation of the excitation beam 320 to ensure the pixels are modulated with the proper data.

In some implementations, a designated servo beam is scanned over the screen by the same scanning module that scans the image-carrying excitation optical beam. This designated servo beam is used to provide servo feedback control over the scanning excitation beam to ensure proper optical alignment and accurate delivery of optical pulses in the excitation beam during normal display operation. This designated servo beam has an optical wavelength different from that of the excitation beam. As an example, this designated servo beam can be an infrared (IR) servo beam that may be invisible to the human eye. The examples below use an IR servo beam 130 to illustrate features and operations of this designated servo beam.

Figure 8:
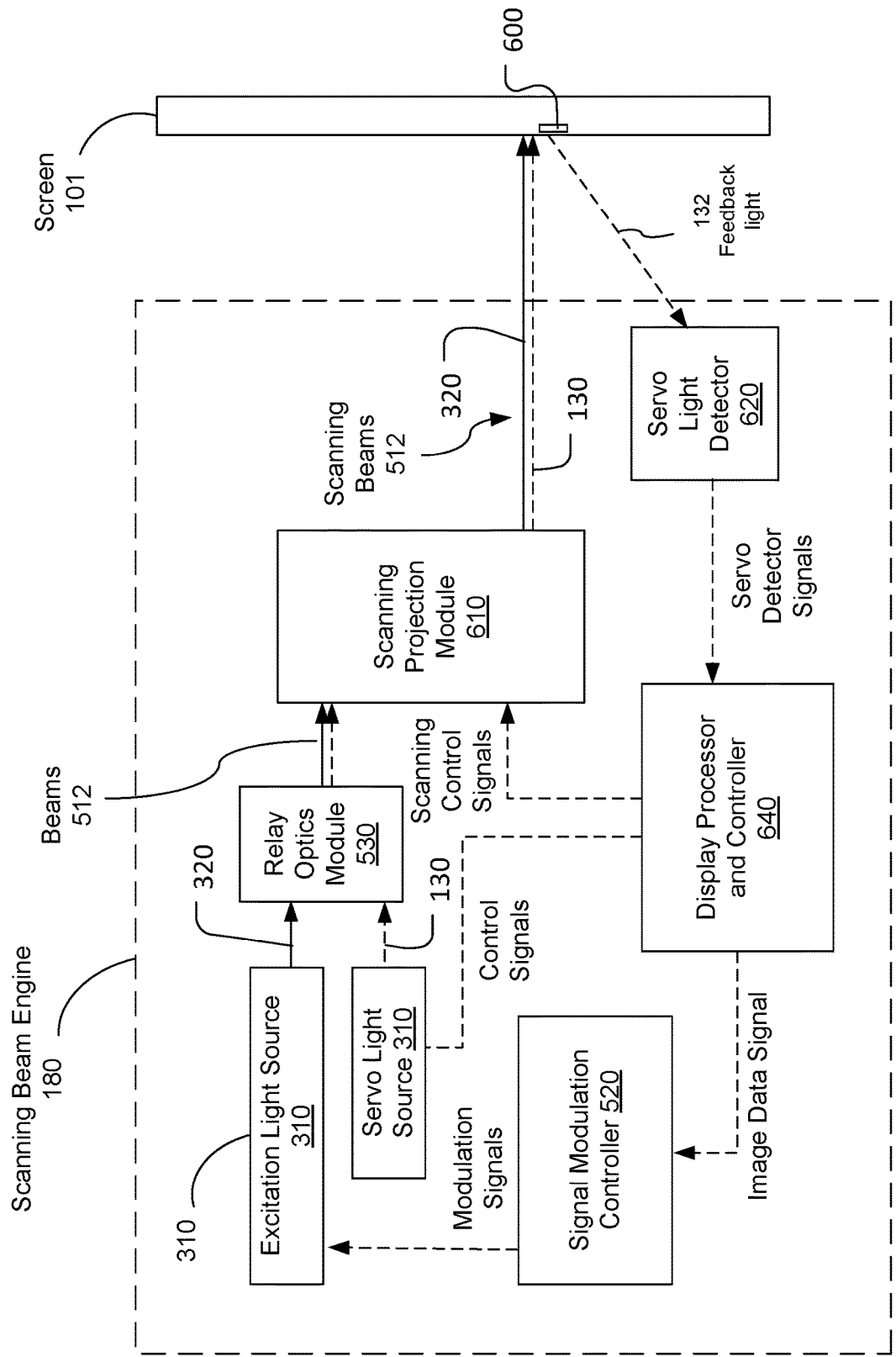
FIG. 8 is a schematic diagram of an example of a scanning display system using a servo feedback control based on a scanning servo beam.

Referring to FIGS. 7 and 8, each scanning beam engine 180 can produce a servo beam 130, e.g., an infrared beam. The scanning beam engine 180 scans the servo beam 130 on the screen 101 along with the excitation beam 320. Unlike the excitation beam 320, the servo beam 130 need not be modulated to carry image data. Thus, the servo beam 130 can be a continuous wave beam. Alternatively, the servo beam 130 can be turned on when expected to be in the general scan region of the reference marks, and otherwise turned off. In either case, the servo beam 130 is not modulated with image data.

The servo beam 130 can be invisible to the human eye and thus not produce any noticeable visual artifact on the screen 101 during the normal operation of the system when images are produced on the screen 101. For example, the servo beam 130 can be an infra red beam, e.g., have a wavelength in a range from 780 nm to 820 nm. For safety concerns, the screen 101 can be made to have a filter that blocks the invisible servo beam 130 and/or the excitation beam 320 from exiting the screen 101 on the viewer side. Similarly the display screen 101 can include a dichroic filter that reflects the servo beam 130 but allows passage of the excitation beam 320. In this regard, a cutoff absorbing filter with a bandpass transmission range only in the visible spectral range (e.g., from 420 nm to 680 nm) may be used to block the servo beam 130 and the excitation beam 320. The servo control of the excitation beam 320 based on the servo beam 130 can be performed dynamically during the normal operation of the system. This servo design avoids manipulation of the image-producing excitation beam 320 during the normal display mode for servo operations and thus avoids any visual artifacts that may be caused by the servo-related manipulation of the image-producing excitation beam 320.

Figure 6B:
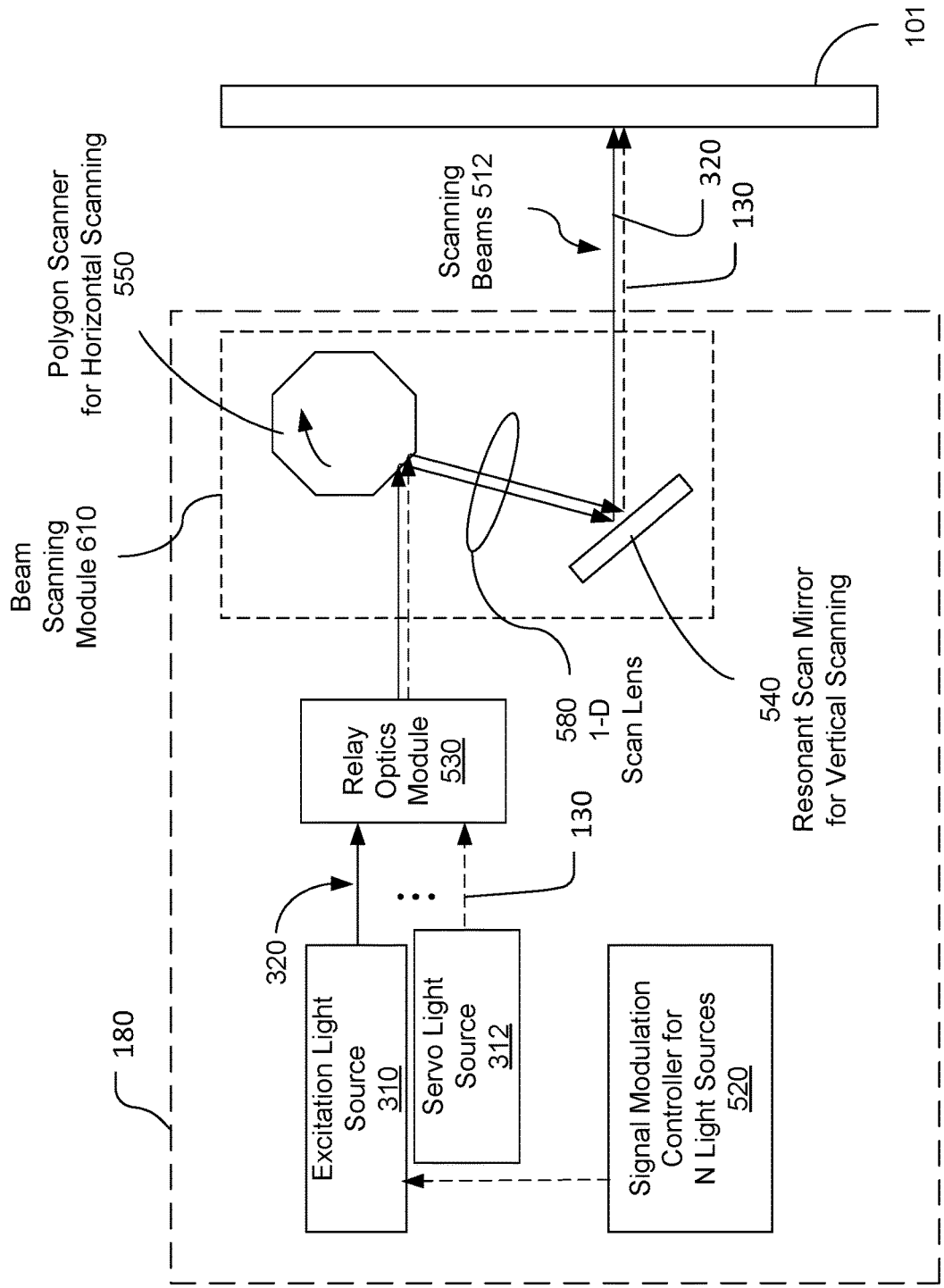
FIG. 6B is a schematic diagram of an example implementation of a post-objective scanning beam display configuration.

As shown in FIGS. 6A and 6B, the servo beam 130 is directed along with the excitation beam 320 through the same optical path in the scanning beam engine 180. A light source 312 for generating the servo beam 130 can be a semiconductor laser in a light source module, e.g., the same module that generates the excitation beam 320. The servo beam 130 can be overlapped with a scanning path of the excitation beam 320 or travel along its own scanning path that is different from a path of any of the excitation beams 320. The positioning of the various components is fixed such that the spatial relation between the servo beam 130 and each excitation beam 320 is fixed and known through a calibration process. Consequently, the positioning of the servo beam 130 on the screen 101 can be used to determine the positioning of the excitation beam 320.

Returning to FIGS. 7 and 8, servo reference marks on the screen 101 can produce feedback light 132. The servo beam 130 has a known spatial relation with the excitation beam 320. Therefore, the positioning of the servo beam 130 can be used to determine the positioning of the excitation beam 320. This relationship between the servo beam 130 and the excitation beam 320 can be determined by using reference servo marks such as a start of line (SOL) mark in a non-viewing area of the screen 101. The scanning beam engine 180 receives and detects the feedback light 132 to obtain positioning information of the servo beam 130 on the screen 101 and uses this positioning information to timing of modulation of the excitation beam 320.

FIG. 8 illustrates a scanning beam display system based on a servo control using the servo beam 130. A display processor and controller 640 can be used to provide control functions and control intelligence based on one or more servo detector signals from one or more radiation servo detectors 620 that detect servo feedback light 132 from the screen 101. A single detector 620 may be sufficient, although two or more servo detectors 620 can be used to improve the servo detection sensitivity.

A plurality of servo reference marks 600 are included in the screen 101. The servo reference marks on the screen 101 can produce feedback light 132. Each servo reference mark 600 has a different reflectivity to the servo beam 130 than the surrounding area, and thus the detector 620 can detect the change in intensity when the servo beam 130 scans across the reference mark. Alternatively or in addition, the detectors 620 can also be used to collect excitation servo light 122 produced by scattering or reflecting the excitation beam 320 at the screen to provide additional feedback signals to the processor and controller 640 for the servo control.

In FIG. 8, a scanning projection module 610 is provided to scan and project the excitation beam 320 and servo beam 130 onto the screen 101. The module 610 can be in a post-objective configuration or a pre-objective configuration. As illustrated, the image data is fed to the display processor and controller 640 which produces an image data signal carrying the image data to the signal modulator controller 520 for the light sources 310, e.g., the excitation laser. The servo light source 312 need not be modulated to carry image data. Where the light sources are lasers, the signal modulation controller 520 can include a laser driver circuit that produces a laser modulation control signal carrying image signals with image data assigned to the laser 310. The laser control signal is then applied to modulate the laser 310, e.g., the current for a laser diode to produce the laser beam 320.

The display processor and controller 640 also produces control signals to the signal modulation controller 520 to synchronize the modulation with the horizontal position of the beam 320 on the screen 101. In other words, the controller 640 can determine a horizontal position of the beam 320 based on the signal from the servo light detector 620. Based on the horizontal position, the controller 640 determines which image data should be used to modulate the excitation beam 320, and adjusts the timing of the modulation such that appropriate data is used to modulate respective pixels.

In addition, the controller 640 can selectively deactivate the excitation light source 310 for certain portions of the horizontal scan time. This can be used to compensate for the sinusoidal dwell time of the light beam along the horizontal axis caused by the resonant scan mirror.

As noted above, the reference marks 600 are made to be optically different from the areas surrounding and between the reference marks 600 to allow for optical detection of the reference marks 600 and thus to register the position of the servo beam 130 and excitation beams 320. The reference marks 600 can be formed on the screen 101 while maintaining the substantially the same optical transmission for the excitation beam 320 as the areas surrounding and between the reference marks 600. Therefore, the presence of the servo reference marks 600 does not optically interfere with the optical transmission of the excitation beam 320.

The servo reference marks 600 can be implemented in various configurations. For example, each servo reference mark 600 can be specularly reflective to light of the servo beam 130, and the areas surrounding and between the reference marks 600 can be are configured to be either transmissive, absorptive, or diffusely reflective. Assuming that the detector 620 is positioned on the incidence angle of the servo beam 130 on the screen to receive specularly reflected light, there will be a sudden increase intensity of the feedback light 132 each time the servo beam 320 crosses the reference mark 600.

Alternatively, the servo reference marks 600 can also be made diffusively reflective to light of the servo beam 130, and the areas surrounding and between the marks 600 can be specularly reflective. Assuming that the detector 620 is positioned off the incidence angle of the servo beam on the screen 101 so as to receive diffusely reflected light, there will be a sudden increase intensity of the feedback light 132 each time the servo beam 320 crosses a reference mark 600.

Returning to FIG. 7, the display screen 101 can include one or more servo reference marks 600. A variety of different shapes or functions are possible for the reference marks 600. The display screen 101 can include multiple reference marks, and the display screen 101 can include or more servo reference of different shapes or functions.

For example, the display screen 101 can include one or more servo scribe lines 602 that extend vertically in the display region 110. Each time the servo beam 130 crosses a scribe lines 602, there will be a change (e.g., an increase in intensity for a diffuse mark on a specular background with the detector off the incidence angle) in the intensity of the feedback light 132. The controller 640 (see FIG. 8) can receive the signals from the detector 620 and determine the time at which the servo beam 130 crosses the mark 602. Because the scribe lines 610 are in a known position relative to the fluorescent stripes 150, and the excitation beam 320 is in a known position relative to the servo beam 130, the controller 640 can determine the horizontal position of the excitation beam 520 relative to the fluorescent stripes 150.

Assuming the servo beam 130 crosses a given mark 602 twice per oscillation (e.g., once as the resonant scan mirror is swinging left, and once as the resonant scan mirror is swinging right), the controller can determine the oscillation rate of the resonant scan mirror. Then, the horizontal position of the excitation beam can be determined based on the time at which the servo beam 130 crosses the mark 604. For example, the controller 640 can store a predetermined function that models the horizontal position of the excitation position as a function of time. For example, the function can be a sinusoidal function. The horizontal position can then be calculated using the known time, the predetermined function, and the oscillation rate. For example, the oscillation rate can be used as a scaling factor for the predetermined function.

Alternatively, if the marks 600s are distributed with a sufficiently high density across the screen 101, e.g., if there is scribe line 602 after each tuple of differently colored fluorescent stripes 150, the horizontal position can be determined directly without modelling of the motion of the excitation beam. The controller 640 can simply count the number of pulses from the detector 620; this number will correspond to the position of the excitation beam.

The display screen 101 can optionally include at least one mark 604 of different shape or size than the scribe line 602. For example, the mark 604 can be wider along the scan direction. The mark 604 is positioned at a known horizontal position relative to the fluorescent stripes 150. The mark 604 could be at an edge of the display region 101 or in a center of the display region. Each time the servo beam 130 crosses the servo mark 604, there will be a change in the intensity of the feedback light 132. The controller 640 (see FIG. 8) can receive the signals from the detector 620 and determine the time at which the servo beam 130 crosses the mark 604. The mark 604 can be distinguished from the marks 602 by the controller based the duration of the signal, e.g., the wider mark results in a pulse. The controller 640 can use detection of the mark 604 to reset the count the number of pulses from the detector 620 generated by the marks 602.

In addition, the display screen 101 can include one or marks 606 that provide a signal that can be used to determine a vertical position of the servo beam 130. For example, the mark 606 can have a triangular shape. If the servo beam 130 crosses the mark 606 in a thin section of the triangle, there be a change in the intensity of the feedback light 132 for a short period of time. If the servo beam 130 crosses the mark 606 in a wider section of the triangle, there be a change in the intensity of the feedback light 132 for a short period of time. Therefore the duration of the change in the intensity (e.g., a duration of a step in the signal) can be used by the controller 640 to determine a vertical position of the excitation beam 320.

The display system 100 can also include an optical sensor positioned to monitor the intensity of the light emitted by the phosphors. This data can be fed to the controller 640, which can be configured to control the intensity of the excitation beam so that any particular grey scale level will provide uniform brightness across the display screen. has a uniform so that to match the brightness of all the zones at all grey levels. The controller 640 can also be configured to detect laser power decay based on the signal from the optical sensor.

The controller can be implemented in digital electronic circuitry, or in computer software, firmware, or hardware, or in combinations of them. The controller can be implemented using one or more computer program products, i.e., one or more computer programs tangibly embodied in a non-transitory machine readable storage media, for execution by, or to control the operation of, data processing apparatus, e.g., a programmable processor, a computer, or multiple processors or computers.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent application. For example The separate servo beam can be omitted, and the excitation beams 320 can be used as the servo beam. In this case, servo reference marks on the screen 101 can have different reflectivity to excitation beam 320 than surrounding areas, thereby producing feedback light 132.

A single display region 110 can be scanned by more than one excitation beam 320. For example, multiple excitation beams can be fed through the scanning projection module 610 and reflected in common from the polygon mirror and resonant scan mirror.

Accordingly, other embodiments are within the scope of the following claims.

What is claimed is:

1. A display system comprising:
a display screen comprising at least one servo feedback mark in each of a plurality of display regions;
a plurality of subsystems, each subsystem configured to generate an image on an associated display region of the plurality of display regions, each subsystem including
one or more light sources to generate a plurality of scanning beams including to an excitation beam and a servo beam,
a beam scanning module to receive the scanning beams and to direct the scanning beams onto the associated display region of the display screen, the beam scanning module including a resonant scanning mirror configured to scan the scanning beams along a first scanning direction across the associated display region and a linear scanning mirror to scan the scanning beams along a second scanning direction across the associated display region,
a servo feedback detector positioned to receive feedback light of the servo beam from the associated display region, to detect the servo feedback mark from the feedback light, and to produce a monitor signal indicative of a position of at least one beam on the display region, and
a controller configured to receive image data including pixel data representing intensity values of pixels, to modulate the excitation beam in accordance with the image data, and to control timing of modulation of the excitation beam based on the monitor signal to align modulation based on intensity values of pixels with corresponding pixel positions on the display screen.

2. The display system of claim 1, wherein the linear scanning mirror comprises a rotating polygon mirror or galvo scanning mirror.

3. The display system of claim 1, wherein the display screen comprises a plurality of fluorescent stripes, the stripes extending along the second scanning direction.

4. The display system of claim 3, wherein the at least one servo feedback mark comprises a mark positioned between adjacent stripes.

5. The display system of claim 3, wherein the at least one servo feedback mark comprises a mark positioned between at an edge of the display region.

6. The display system of claim 1, wherein the controller is configured to configured to determine an oscillation frequency of the resonant scanning mirror based on the monitor signal.

7. The display system of claim 6, wherein the controller is configured to determine a position of the excitation beam over time from the oscillation frequency, a predetermined function that models a position of the excitation beam along the first scanning direction as a function of time, and a time that the servo beam crosses the servo feedback mark.

8. The display system of claim 1, wherein the display screen comprises a plurality of servo feedback mark in each of the plurality of display regions, the plurality of servo feedback marks distributed along the first scanning direction such that the servo beam reflects from each of the plurality of feedback marks in succession as the servo beam is scanned along the first scanning direction.

9. The display system of claim 8, wherein the controller is configured to determine a position of the excitation beam over time based on a number of servo feedback marks crossed by the servo beam.

10. The display system of claim 1, wherein a scanning speed of the excitation beam along the first scanning direction is greater than a scanning speed of the excitation beam along the second scanning direction.

* * * * *